United States Patent
Park (10) Patent No.: US 11,325,694 B2
(45) Date of Patent: May 10, 2022

(54) AERIAL VEHICLE HAVING INCLINE-CONTROLLABLE WINGS

(71) Applicant: Korea Aerospace Research Institute, Daejeon (KR)

(72) Inventor: Young Min Park, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 288 days.

(21) Appl. No.: 16/094,620

(22) PCT Filed: Mar. 8, 2017

(86) PCT No.: PCT/KR2017/002477
§ 371 (c)(1),
(2) Date: Oct. 18, 2018

(87) PCT Pub. No.: WO2017/188587
PCT Pub. Date: Nov. 2, 2017

(65) Prior Publication Data
US 2019/0106207 A1 Apr. 11, 2019

(30) Foreign Application Priority Data
Apr. 27, 2016 (KR) .................. 10-2016-0051675

(51) Int. Cl.
*B64C 27/28* (2006.01)
*B64C 13/18* (2006.01)
(Continued)

(52) U.S. Cl.
CPC .............. *B64C 27/28* (2013.01); *B64C 13/18* (2013.01); *B64C 27/52* (2013.01); *B64C 39/024* (2013.01);
(Continued)

(58) Field of Classification Search
CPC ......... B64C 27/22; B64C 27/32; B64C 27/52; B64C 29/00; B64C 3/385; B64C 3/40
See application file for complete search history.

(56) References Cited

U.S. PATENT DOCUMENTS 8,544,787 B2 10/2013 Lee et al.
2005/0178879 A1 8/2005 Mao
(Continued)

FOREIGN PATENT DOCUMENTS

KR 10-1125870 B1 3/2012
KR 10-1418488 B1 7/2014
(Continued)

OTHER PUBLICATIONS

International Search Report and Written Opinion of the International Searching Authority issued in PCT/KR2017/002477, dated May 26, 2017; ISA/KR.

*Primary Examiner* — Joshua J Michener
*Assistant Examiner* — Cindi M Curry
(74) *Attorney, Agent, or Firm* — Harness, Dickey & Pierce, P.L.C.

(57) ABSTRACT

An aerial vehicle having incline-controllable wings, according to one embodiment, can comprise: a body; a thrust part connected to the body and having a propeller and a rotary shaft; and the wings respectively arranged at both sides of the body, and disposed to be spaced from the thrust part. The wings pitch and rotate around a horizontal axis of the body such that the angle of attack of the wings is controlled, and an angle between the rotary shaft of the thrust part and the wing can vary because of the pitching and rotation of the wings.

8 Claims, 7 Drawing Sheets

(51) Int. Cl.
  *B64C 27/52* (2006.01)
  *B64C 39/02* (2006.01)
  *B64C 3/38* (2006.01)
  *B64D 45/00* (2006.01)
  *B64C 29/00* (2006.01)

(52) U.S. Cl.
  CPC ................ *B64C 3/38* (2013.01); *B64C 29/00* (2013.01); *B64C 2201/027* (2013.01); *B64C 2201/141* (2013.01); *B64D 45/00* (2013.01)

(56) References Cited

U.S. PATENT DOCUMENTS

| | | | |
|---|---|---|---|
| 2013/0026302 A1* | 1/2013 | Lee | B64C 3/385 244/7 R |
| 2014/0008498 A1* | 1/2014 | Reiter | B64C 29/00 244/7 A |
| 2016/0266164 A1* | 9/2016 | Ellison | G01P 13/025 |

FOREIGN PATENT DOCUMENTS

| | | | | |
|---|---|---|---|---|
| KR | 10-2014-0125222 A | 10/2014 | | |
| KR | 20150058197 A | 5/2015 | | |
| KR | 10-2016-0014266 A | 2/2016 | | |
| WO | WO-2016004852 A1 * | 1/2016 | ............. | B64C 29/00 |
| WO | WO-2016035068 A2 * | 3/2016 | ............... | B64C 3/38 |

\* cited by examiner

AERIAL VEHICLE HAVING INCLINE-CONTROLLABLE WINGS

TECHNICAL FIELD

The present invention relates to an aerial vehicle having an inclination-controlled wing of which an angle of attack is to be controlled for a long-distance flight and, more particularly, an aerial vehicle having an inclination-controlled wing to increase energy efficiency for long-distance flight, cruise using a lift of the wing, and cruise using the wing using a thrust of a propeller thrust portion for flying forward or reducing an output.

BACKGROUND ART

Among aerial vehicles, unmanned aerial vehicle may be operated remotely by using radio waves without the need for a person to board. The aerial vehicles have been rapidly developed as transportations for carrying out military missions in dangerous areas instead of people and carrying weapons and fuels.

In recent years, with developments of technologies for manufacturing the unmanned aerial vehicle, costs have been reduced and an applicability has been increased. For this reason, the unmanned aerial vehicle is used for various purposes in many organizations such as global companies, information technology (IT) companies, and universities of engineering.

In particular, the unmanned aerial vehicle may be developed for the purpose of moving to area where human beings are difficult to access, searching a wide area, or performing wide-range transportation.

In general, the unmanned aerial vehicle may generate a lifting force for take-off using a plurality of propellers and realize a forward flight by changing directions of the propellers.

The unmanned aerial vehicle is disclosed in Korean Patent Application Publication No. 2016-0014266 filed on Jul. 29, 2014 and entitled as "DRONE."

DISCLOSURE OF INVENTION

Technical Goals

An aspect provides an aerial vehicle having increased power efficiency for long-time operation.

Another aspect provides an aerial vehicle having an increased flight speed.

Still another aspect provides an aerial vehicle capable of searching a wide range according to an increase in power efficiency.

Yet another aspect provides an aerial vehicle that performs a predetermined task requiring a long-term flight such as a forest fire observation.

Further another aspect provides an aerial vehicle that is easy to change a direction and maintain a balance.

Technical Solutions

According to an aspect, there is provided an aerial vehicle including a body, a thrust portion connected to the body and having a propeller and a rotary shaft, and wings disposed at both sides of the body and arranged to be spaced apart from the thrust portion, wherein the wings are pitch-rotated with respect to a horizontal axis of the body such that angles of attack of the wings are adjusted and wherein an angle between the rotary shaft of the thrust portion and each of the wings varies based on a pitch rotation of the wings.

The thrust portion may be fixedly attached to the body such that the rotary shaft of the thrust portion is perpendicular to the body, and the wings may have angles variable within vertical and horizontal ranges with respect to the body.

The aerial vehicle may be changed to be in a take-off and landing mode, a cruise mode, a high-speed flight mode, and a stationary flight mode. In the take-off and landing mode, the wings may be changed to be parallel to the rotary shaft of the thrust axis so as to be perpendicular to the thrust portion. In the cruise mode, the wings may be changed to be at an inclined angle with respect to the rotary shaft such that an acute angle is formed between the thrust portion and each of the wings. In the high-speed flight mode, the rotary shaft of the thrust portion may be changed to be parallel to the wings such that the thrust portion is perpendicular to the wings. In the stationary flight mode, when wind is absent, the wings may be changed to be perpendicular to the body and when wind is present, the wings may be changed to be angled in a direction of the wind.

A rotation speed of the thrust portion may decrease when the angle between the thrust portion and each of the wings is the acute angle, and the rotation speed of the thrust portion may increase when the angle between the thrust portion and each of the wings is a right angle.

The thrust portion may include at least one first thrust portion having a rotary shaft and disposed away from one side of each of the wings and at least one second thrust portion having a rotary shaft and disposed away from a side facing the one side of each of the wings, and the rotary shaft of the first thrust portion and the rotary shaft of the second thrust portion may be perpendicular to the body.

The wings may include a first wing disposed at one side of the body and a second wing disposed at another side of the body, and rotation angles of the first wing and the second wing may be individually controlled such that a pose and a direction of the aerial vehicle are adjusted.

The aerial vehicle may include a sensor configured to measure information applied to the aerial vehicle, a controller configured to control an angle between the rotary shaft and the wings by pitch-rotating the wings based on the information measured by the sensor, and a servomotor controlled by the controller and configured to provide a power for changing the wings such that the angle between the rotary shaft and each of the wings is changed.

The sensor may include at least one of a measurement sensor configured to measure an altitude, a speed, and a flow angle of an air generated in response to the aerial vehicle travelling, differential pressure sensors disposed on an upper side and a lower side of each of the wings to measure a flow angle using a pressure difference between the upper side and the lower side, and a flow sensor configured to measure an air flow around the aerial vehicle such that the controller controls the wings to be changed based on the air flow around the aerial vehicle.

Effects

According to example embodiments, it is possible to provide an aerial vehicle having an inclination-controlled wing with increased power efficiency for long-time operation.

According to example embodiments, it is possible to provide an aerial vehicle having an inclination-controlled wing with an increased flight speed.

According to example embodiments, it is possible to provide an aerial vehicle having an inclination-controlled wing to search a wide range according to an increase in power efficiency.

According to example embodiments, it is possible to provide an aerial vehicle that performs a predetermined task requiring a long-term flight such as a forest fire observation.

According to example embodiments, it is possible to provide an aerial vehicle having an inclination-controlled wing to easily change a direction and maintain a balance.

BEST MODE FOR CARRYING OUT THE INVENTION

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

Figure 1:
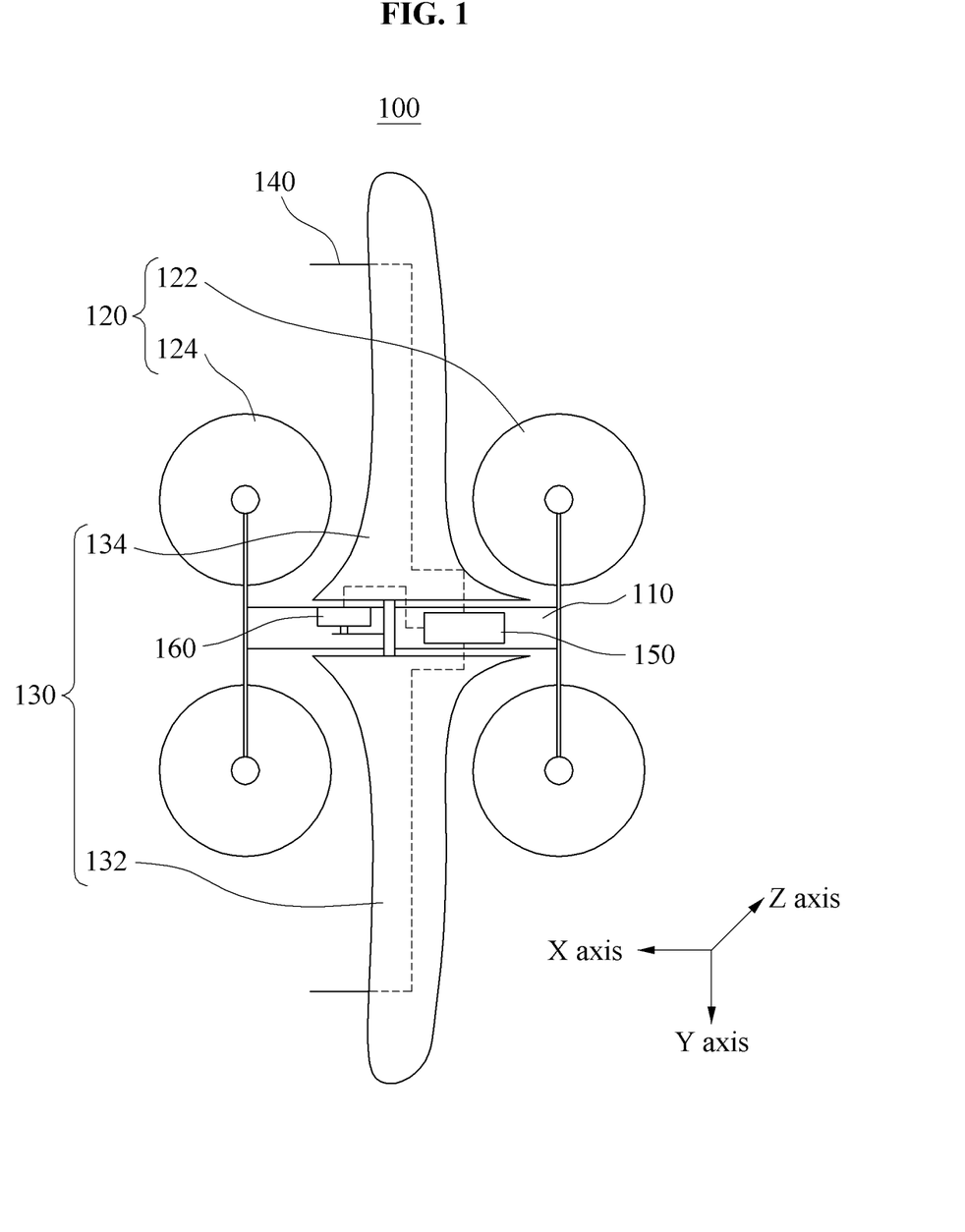
FIG. 1 is a top view illustrating an aerial vehicle having an inclination-controlled wing according to an example embodiment.
Figure 2A:
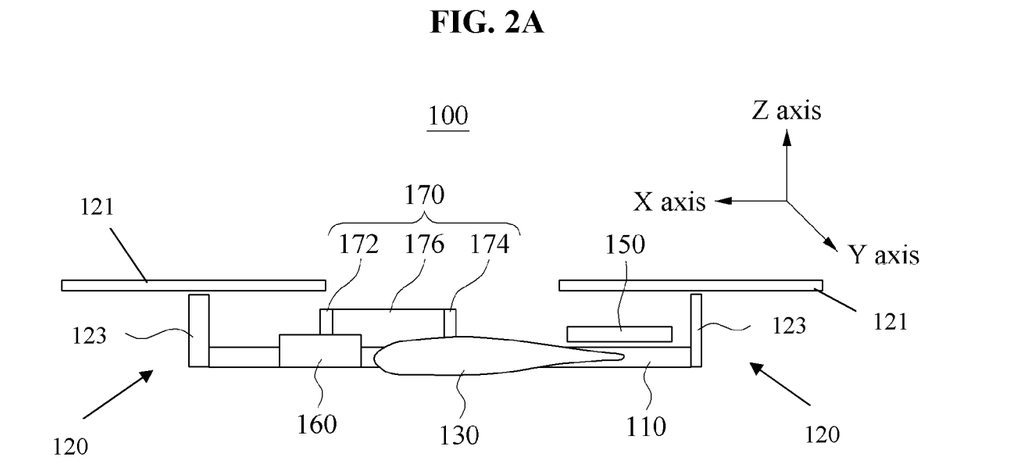
FIG. 2A illustrates an aerial vehicle having an inclination-controlled wing at an angle controlled to be in parallel to a body using a servomotor according to an example embodiment.
Figure 2B:
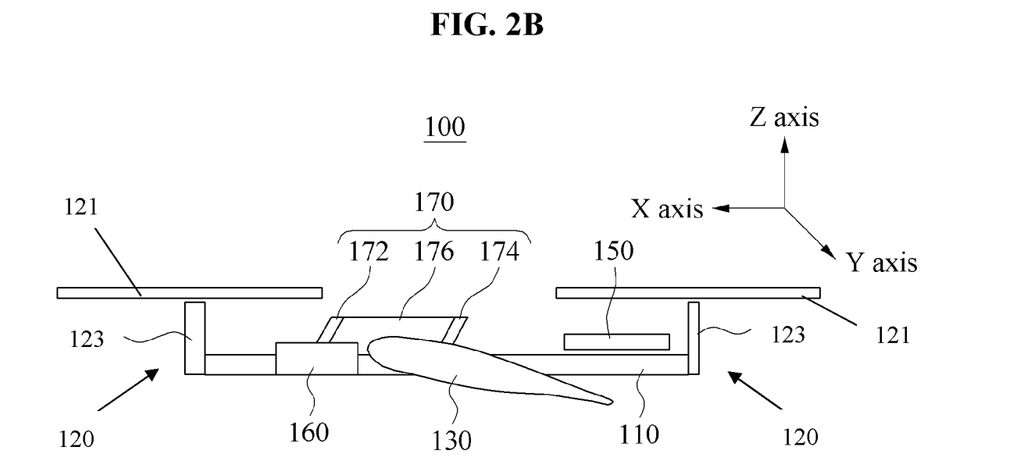
FIG. 2B illustrates an aerial vehicle having an inclination-controlled wing of which a wing blade is controlled downwardly using a servomotor according to an example embodiment.
Figure 2C:
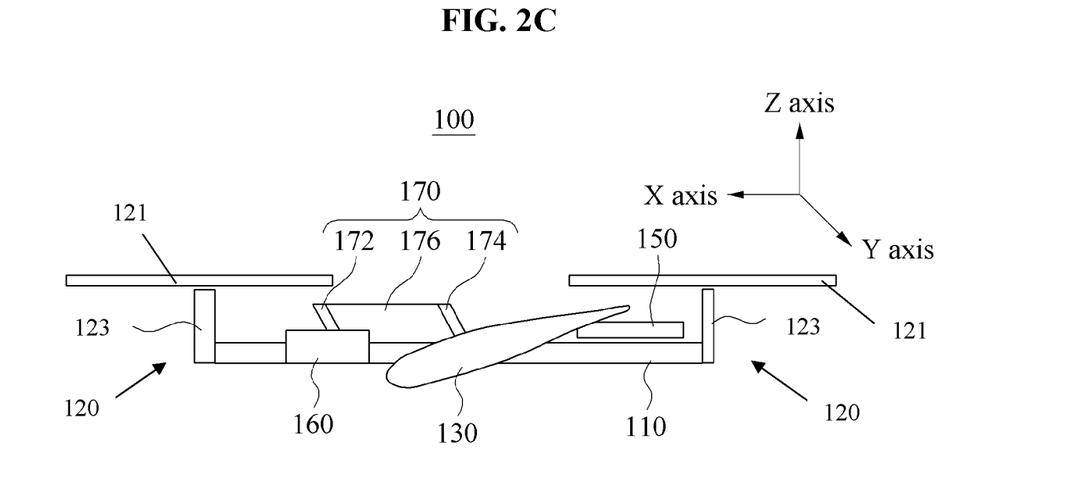
FIG. 2C illustrates an aerial vehicle having an inclination-controlled wing of which a wing blade is controlled upwardly using a servomotor according to an example embodiment.

FIG. 1 is a top view illustrating an aerial vehicle 100 having an inclination-controlled wing 130 according to an example embodiment, and FIGS. 2A through 2C are diagrams illustrating the aerial vehicle 100 having the inclination-controlled wing 130 at an angle controlled to be in parallel to a body using a servomotor 160 according to an example embodiment.

Referring to FIG. 1, the aerial vehicle 100 having the wing 130 may include a body 110, a thrust portion 120, and the wing 130.

The body 110 may be a casing including elements such as a power portion and a communicator for operation of the aerial vehicle 100. The body 110 may have a streamlined surface to reduce resistance during the operation of the aerial vehicle 100.

The body 110 may be made of a lightweight material to reduce a weight of the aerial vehicle 100 and increase an operational efficiency. Also, the body 110 may be made of a hard material to achieve a durability required for the operation in a high altitude and speed environment.

A surface of the body 110 or the wing 130 may be provided with a solar panel to generate power, thereby improving an energy efficiency.

The thrust portion 120 may be connected to the body 110, and may include a propeller 121 and a rotary shaft 123.

The rotary shaft may rotate using power received from the body 110.

The propeller may have a plurality of blades arranged radially in a circumferential direction based on the rotary shaft. Also, the plurality of blades may be arranged obliquely on the rotary shaft and rotated in accordance with a rotation of the rotary shaft so as to generate a lifting force through the rotation. The thrust portion 120 may generate a thrust force to operate the aerial vehicle 100.

The thrust portion 120 may be fixedly attached to the body 110 such that the rotary shaft of the thrust portion 120 is disposed to be perpendicular to the body 110. When the aerial vehicle 100 takes off, the body 110 may be parallel to a ground and the rotary shaft of the thrust portion 120 may be perpendicular to the ground. Also, a rotating surface of the propeller, which is a rotational radius of the propeller, may be disposed perpendicular to the rotary shaft so as to be parallel to the ground.

Although four thrust portions are shown in the drawing, embodiments are not limited thereto.

The thrust portion 120 may include a first thrust portion 122 disposed away from one side of the wing 130 and a second thrust portion 124 disposed away from a side facing the one side of the wing 130.

For example, as illustrated in FIG. 1, the first thrust portion 122 may be disposed in the rear of the wing 130 as a plurality of first thrust portions and the second thrust portion 124 may be disposed in front of the wing 130 as a plurality of second thrust portions.

The wings 130 may be disposed at both sides of the body 110 and spaced apart from the thrust portion 120. For example, the wings 130 may be arranged on both sides of the body 110 to face each other. As such, the wings 130 may be disposed symmetrically about the body 110 in the left-right direction.

Although the present example illustrates and describes that the aerial vehicle includes two wings on both sides, embodiments are not limited thereto. Depending on an example, the aerial vehicle may include a tail wing, a single wing, or at least two pairs of wings.

For example, the wings 130 disposed on both sides of the body 110 may be integrally formed. In this example, the wings 130 disposed on left and right sides of the body 110 may simultaneously pitch-rotate in the same direction. Also, the wing 130 may include a first wing 132 disposed at one side of the body 110 and a second wing 134 disposed at another side of the body 110. The first wing 132 and the second wing 134 may be individually controlled to adjust a pose and a direction of the aerial vehicle 100.

The wing 130 may generate the lifting force during the operation of the aerial vehicle 100, thereby increasing a fuel efficiency of the aerial vehicle 100 and extending an operation time.

A rotation shaft or a bearing may be provided in an area connecting the wing 130 and the body 110 such that the wing 130 is pitch-rotated relative to the body 110.

Specifically, as illustrated in FIGS. 1 through 2C, a coordinate system of the aerial vehicle 100 may be defined by an x axis corresponding to a longitudinal axis of the body 110, a y axis corresponding to a longitudinal axis of the wing 130, and a z axis perpendicular to a plane formed by the x axis and the y axis. In the coordinate system, the wing 130 may rotate about the y axis, that is, the lateral axis of the wing 130 that intersects the x axis, and a y-axial rotation of the wing 130 may be referred to as a pitch rotation.

Although the wings are connected to the body using the rotary shaft or the bearing, embodiments are not limited thereto. For example, the wings and the body may be connected to each other to be pitch rotated based on a structure such as a guide groove and a protrusion used in the art.

The wing 130 may be pitch-rotated with respect to the body 110 using the aforementioned method, so that an angle between the wing 130 and the rotary shaft of the thrust portion 120 that is to be fixed to the body 110 varies. That is, an angle of the wing 130 may be changed relative to the body 110 and the rotary axis.

Also, the wing 130 may include a solar panel to use solar heat as a power source for controlling equipment, for example, firefighting equipment, rescue equipment, and delivery items provided in the aerial vehicle 100.

The aerial vehicle 100 may further include a sensor 140, a controller 150, and a servomotor 160.

The sensor 140 may measure an altitude, a speed, and a flow angle of a fluid applied to the aerial vehicle 100. The sensor 140 may be one of a measurement sensor configured to measure an altitude, a speed, and a flow angle of an air generated in response to the aerial vehicle 100 travelling, differential pressure sensors disposed on an upper side and a lower side of the wing 130 to measure a flow angle using a pressure difference between the upper side and the lower side, and a flow sensor configured to measure an air flow around the aerial vehicle 100 such that the controller 150 controls the wing 130 to be changed based on the air flow around the aerial vehicle 100. The sensor 140 may be, for example, an acceleration sensor and an inertial sensor.

The sensor 140 may be, for example, a small sensor that is disposed at an inner side of the wing.

For example, the sensor 140 may be a 5-hole probe having a rod shape and a hole at an end. The 5-hole probe may measure pressure values applied to the hole arranged to the end and calculate a flow speed, an altitude, an angle of sideslip corresponding to a horizontal angle, and an angle of attack corresponding to a vertical angle.

The controller 150 may control a motion of the wing 130 based on information measured by the sensor 140. For example, the controller 150 may control the pitch rotation of the wing 130. Also, the controller 150 may control a rotation speed of the thrust portion 120.

The servomotor 160 may be controlled by the controller 150. The servomotor 160 may provide power for changing the wing 130 such that an angle between the rotary shaft and the wing 130 is changed.

Referring to FIGS. 2A through 2C, the aerial vehicle 100 may further include a connection assembly 170.

The connection assembly 170 may change an angle between the wing 130 and the body 110. Specifically, the connection assembly 170 may be connected to the servomotor 160 to receive the power generated in the servomotor 160 and transmit the power to the wing 130.

The connection assembly 170 may be formed, for example, as illustrated in FIGS. 2A and 2B. Referring to FIGS. 2A and 2B, the connection assembly 170 may include a first connecting member 172, a second connecting member 174, and a third connecting member 176.

The first connecting member 172, the second connecting member 174, and the third connecting member 176 may each be in a pole shape. The first connecting member 172 may be connected to the body 110 and circled around a connection point between the body 110 and the first connecting member 172. The second connecting member 174 may be connected to the wing 130 to be fixed vertically thereto and circled around a connection point between the wing 130 and the second connecting member 174. The third connecting member 176 may connect the first connecting member 172 and the second connecting member 174 to transfer a circling movement of the first connecting member 172 to the second connecting member 174.

Through this, the first connecting member 172 and the second connecting member 174 may move in the same direction. Also, the servomotor 160 may change the angle between the wing 130 and the body 110 through the connection assembly 170.

A rotary shaft of the servomotor 160 may be directly connected to the wing 130. The rotary shaft of the servomotor 160 may be rotated by the controller 150, so that the wing 130 rotates.

As illustrated in FIG. 2A, when the wing 130 is controlled to be parallel to the body 110, the servomotor 160 may arrange the first connecting member 172 to be perpendicular to the servomotor 160, the first connecting member 172 may arrange the third connecting member 176 to be parallel to the body 110, and the third connecting member 176 may arrange the second connecting member 174 and the first connecting member 172 to be parallel to each other.

As illustrated in FIG. 2B, when the wing 130 is pitch-rotated obliquely with respect to the body 110 such that a wing blade of the wing 130 faces downward, the first connecting member 172 may be obliquely circled in a direction of the wing 130, the first connecting member 172 may push the third connecting member 176 in a direction of the second connecting member 174, the third connecting member 174 may push the second connecting member 172 to be parallel with the first connecting member 172, and the first connecting member 172 may pitch-rotate the wing 130 such that the wing blade of the wing 130 obliquely faces downward.

As illustrated in FIG. 2C, when the wing 130 is pitch-rotated obliquely with respect to the body 110 such that a wing blade of the wing 130 faces downward, the first connecting member 172 may be obliquely circled in an opposite direction of the wing 130, the first connecting member 172 may pull the third connecting member 176 in an opposite direction of the second connecting member 174, the third connecting member 174 may pull push the second connecting member 172 to be parallel with the first connecting member 172, and the first connecting member 172 may pitch-rotate the wing 130 such that the wing blade of the wing 130 obliquely faces upward.

Although the present example illustrates and describes that the connection assembly includes the first connecting member, the second connecting member, and the third connecting member which are circled and operated to manipulate the wing, embodiments are not limited thereto. The connection assembly may change the wing based on various methods such as a chain type, a gear type and the like.

Figure 3A:
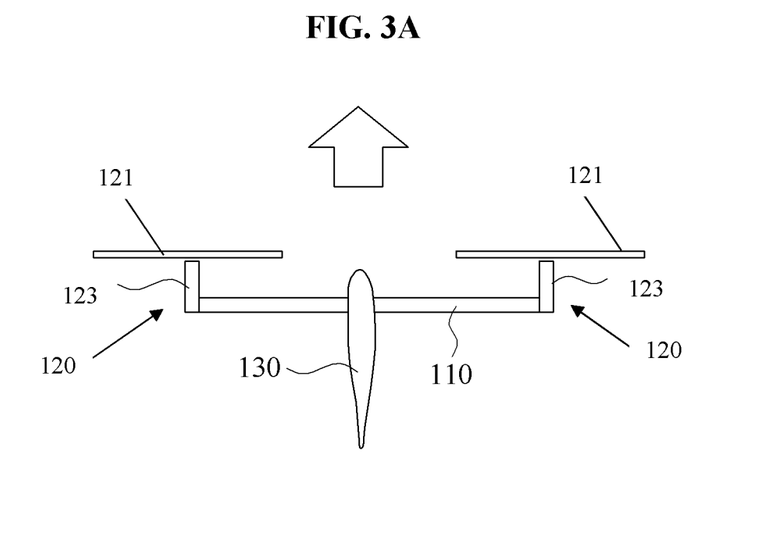
FIG. 3A illustrates a take-off and landing mode of an aerial vehicle having an inclination-controlled wing according to an example embodiment.
Figure 3B:
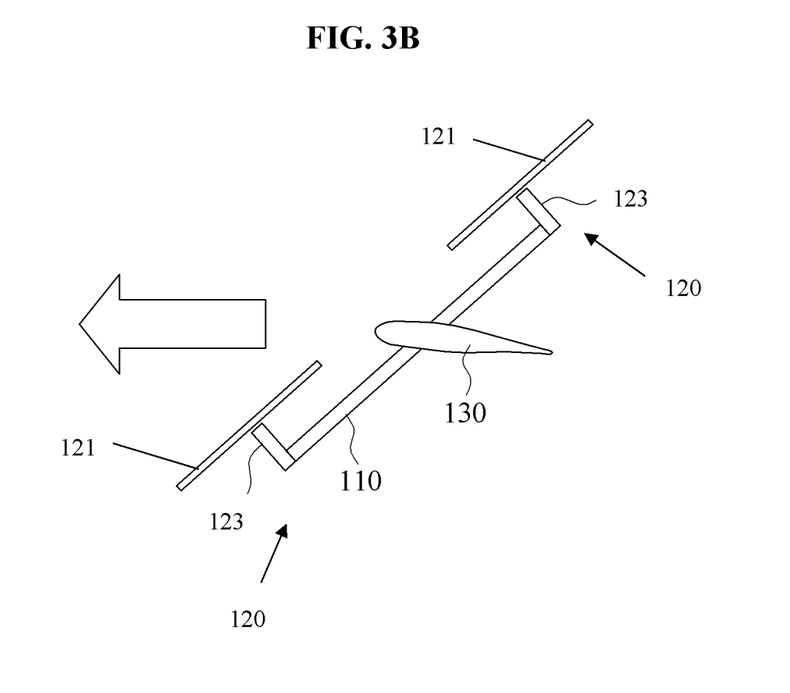
FIG. 3B illustrates a cruise and climb mode of an aerial vehicle having an inclination-controlled wing according to an example embodiment.
Figure 3C:
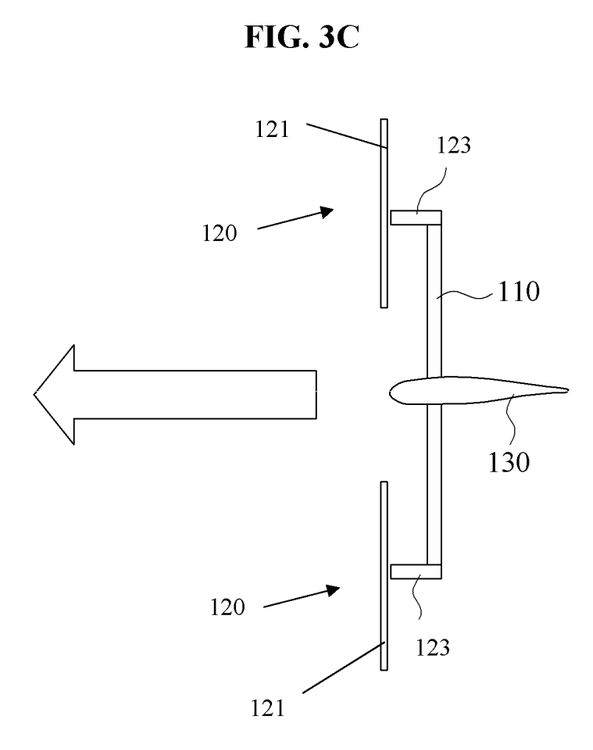
FIG. 3C illustrates a high-speed flight mode of an aerial vehicle having an inclination-controlled wing according to an example embodiment.

FIGS. 3A through 3C illustrate flight modes of the aerial vehicle 100 having the inclination-controlled wing 130 according to an example embodiment.

Referring to FIGS. 3A through 3C, the aerial vehicle 100 may be operated in various forms based on an angle of the wing 130 changed by the controller 150. The aerial vehicle 100 may be changed to be in, for example, the take-off and landing mode, the cruise mode, and the high-speed flight mode.

In the take-off and landing mode, the wing 130 may be changed to be parallel to the rotary shaft of the thrust portion 120 so as to be perpendicular to the thrust portion 120.

In the take-off and landing mode, the wing 130 may be pitch-rotated based on the body 110 in a direction vertical to the body 110. For example, in a take-off mode, a back end of the wing 130 may be lowered toward a lower portion of the body 110. Also, in a landing mode, the back end of the wing 130 may be lifted toward an upper portion of the body 110. As such, in the take-off and landing mode, the wing 130 may be arranged to minimize a resistance due to the wing 130.

In the cruise mode, the wing 130 may be changed to be at an inclined angle with respect to the rotary shaft of the thrust portion 120 such that an acute angle is formed between the wing 130 and the thrust portion 120.

In the cruise mode, the wing 130 may be obliquely pitch-rotated based on the body 110. Thus, the wing 130 may be disposed to be at the maximum lift to drag angle of attack in order to supply a lifting force to the aerial vehicle 100. Also, the wing 130 may be obliquely disposed in accordance with wind or in a travelling direction of the aerial vehicle 100.

In the high-speed flight mode, the rotary shaft of the thrust portion 120 may be changed to be parallel to the wing 130 such that the thrust portion 120 is perpendicular to the wing 130.

In the high-speed flight mode, based on the wing 130, the body 110 and the rotary shaft of the thrust portion 120 may be perpendicularly arranged. The high-speed flight mode may be similar to the take-off and landing mode. However, the wing 130 may be disposed to be approximately perpendicular to the ground in the take-off and landing mode, and may be disposed to be approximately parallel to the ground in the high-speed flight mode.

In the take-off and landing mode, based on the ground, the body 110 may be disposed to be parallel to the ground and the wing 130 may be disposed to be perpendicular to the ground. In the cruise mode, the body 110 may be disposed obliquely on the ground and the wing 130 disposed to be at the maximum lift to drag angle of attack. In the high-speed flight mode, the body 110 may be disposed to be perpendicular to the ground and the wing 130 may be disposed to be parallel to the ground.

Also, the aerial vehicle 100 may be in a stationary flight mode.

The aerial vehicle 100 may be located at one point in the stationary flight mode. When the wind is present, the wing 130 may be arranged to be angled in a direction of the wind. In this example, the lifting force may be generated by the wind and the wing 130 and an additional thrust may be obtained, which may lead to energy saving.

When the wind is absent, similarly to the take-off and landing mode, the body 110 may be disposed to be parallel to the ground and the wing 130 may be disposed to be perpendicular to the ground and the body 110.

Figure 4A:
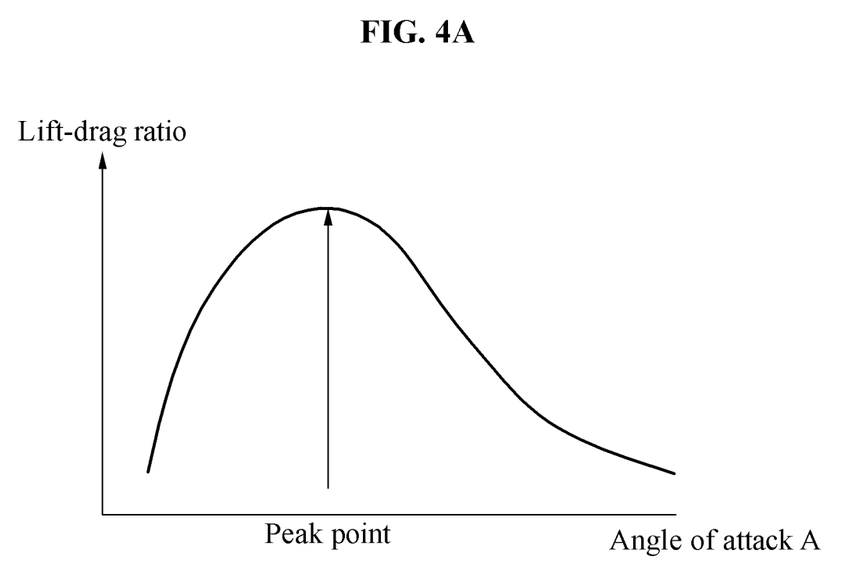
FIG. 4A illustrates a lift-drag ratio obtained based on an angle of attack during flight of an aerial vehicle having an inclination-controlled wing according to an example embodiment.
Figure 4B:
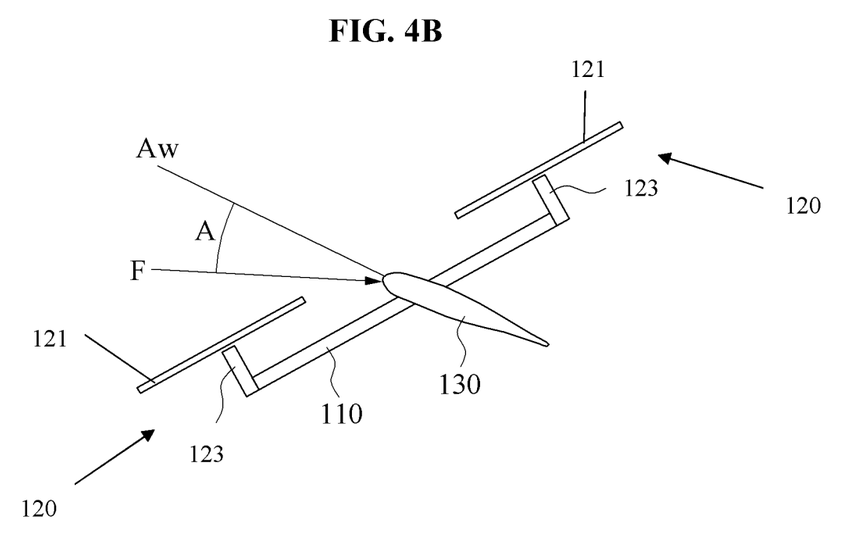
FIG. 4B illustrates an angle of attack.

FIGS. 4A and 4B are diagrams illustrating the aerial vehicle 100 having the inclination-controlled wing 130 and an angle of attack A of the wing 130 of the aerial vehicle 100 according to an example embodiment.

FIG. 4A illustrates a lift-drag ratio obtained based on the angle of attack A of the wing 130, and FIG. 4B illustrates a direction Aw of the wing 130 and a direction F of wind applied to the wing 130 of the aerial vehicle 100. The angle of attack A may be an angle between the direction F of the wind and the direction Aw of the wing 130, that is, an angle of the wind applied to the wing 130.

Referring to FIG. 4A, when the wing 130 adjusts the angle of attack A based on a direction of the wind, a lift-drag ratio may be changed and a lifting force against a drag may be maximized at a predetermined angle. The wing 130 may adjust the angle of attack A based on information measured by the sensor 140, so that the aerial vehicle 100 travels at the angle of attack A advantageous for generating the lifting force.

Figure 5:
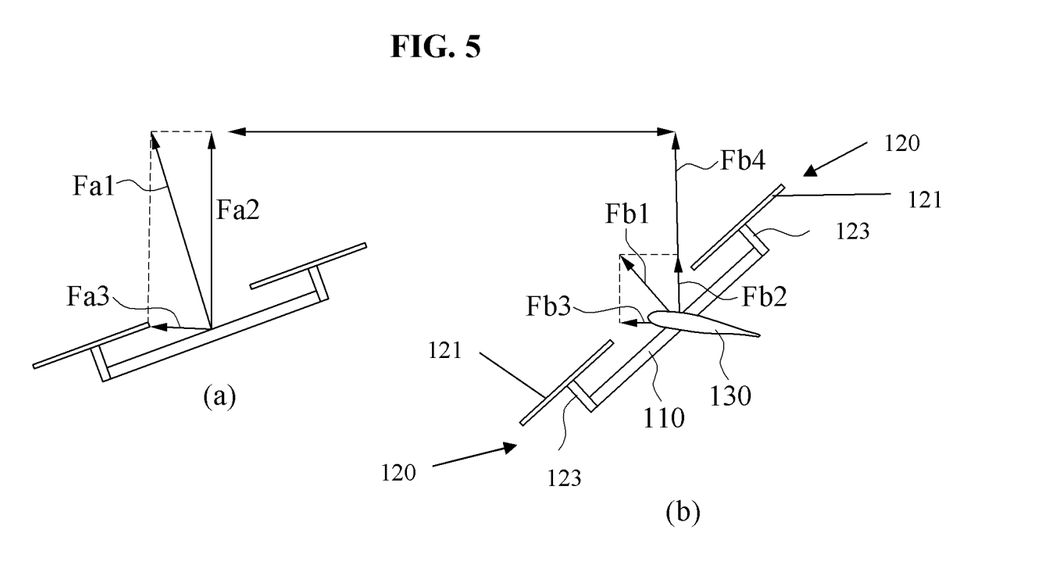
FIG. 5 is a diagram illustrating a lifting force and a thrust force of an aerial vehicle depending on a presence or absence of wings of the aerial vehicle having an inclination-controlled wing according to an example embodiment.

FIG. 5 is a diagram illustrating a lifting force and a thrust force of the aerial vehicle 100 depending on a presence or absence of the wing 130 of the aerial vehicle having the inclination-controlled wing 130 according to an example embodiment.

A part a of FIG. 5 illustrates a lifting force and a thrust force of an aerial vehicle without a wing. Specifically, Fa1 denotes a propeller thrust of the aerial vehicle without wings, Fa2 denotes a lift element which is disassembled from the propeller thrust of the aerial vehicle without wings, and Fa3 denotes a thrust element which is disassembled from the propeller thrust of the aerial vehicle without wings.

A part b of FIG. 5 illustrates a lifting force and a thrust force of the aerial vehicle 100 having the wing 130. Fb1 denotes a propeller thrust of the aerial vehicle 100 having the wing 130, Fb2 denotes a lift element which is disassembled from the propeller thrust of the aerial vehicle 100 having the wing 130, and Fb3 denotes a thrust element which is disassembled from the propeller thrust of the aerial vehicle 100 having the wing 130. Also, Fb4 denotes a lifting force generated by the wing 130 of the aerial vehicle 100.

As indicated by arrows of FIG. 5, the aerial vehicle without wings of the part a of FIG. 5 may require the propeller thrust of Fa1 to generate the lifting force of Fa2. The aerial vehicle 100 having the wing 130 of the part b of FIG. 5 may generate the lifting force of Fa2 using the thrust force of Fb2 (as shown in the drawing, a force smaller than that of the aerial vehicle without wings).

As such, the aerial vehicle 100 having the wing 130 may use a smaller thrust force to generate the lifting force and the thrust force similar to those generated by the aerial vehicle without wings. For example, the lifting force generated by the wing 130 and the lifting force generated by the thrust portion 120 may be used as the lifting force of the aerial vehicle 100 having the wing 130, so that a rotation speed of the thrust portion 120 is reduced during flight.

Through this, an operation time, a flight distance, and a flight speed of the aerial vehicle 100 having the inclination-controlled wing 130 may be improved.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An aerial vehicle comprising:
    a body;
    one or more thrust portions connected to the body, wherein each thrust portion comprises a propeller and a rotary shaft;
    a first wing disposed on a first side of the body, wherein the first wing is spaced apart from the one or more thrust portions;
    a second wing disposed on a second side of the body, wherein the second wing is also spaced apart from the one or more thrust portions; and
    a connection assembly comprising:
        a first connecting member that is coupled to a servomotor, wherein the servomotor is coupled to the body,
        a second connecting member that is coupled to the first and second wings, and
        a third connecting member that connects the first connecting member and the second connecting member,
    wherein the servomotor is configured to provide a power for changing the first and second wings such that the angle between the rotary shaft and each of the wings is changed,
    wherein the first and second wings are pitch-rotated with respect to a horizontal axis of the body such that angles of attack of the first and second wings are adjusted, and
    wherein an angle between the rotary shaft of the one or more thrust portions and each of the wings varies based on a pitch rotation of the wings.

2. The aerial vehicle of claim 1, wherein the one or more thrust portions are fixedly attached to the body such that the rotary shaft of each thrust portion is perpendicular to the body, and
    the first and second wings have angles variable within vertical and horizontal ranges with respect to the body.

3. The aerial vehicle of claim 1, wherein the aerial vehicle is changed to be in a take-off and landing mode, a cruise mode, a high-speed flight mode, and a stationary flight mode,
    in the take-off and landing mode, the first and second wings are changed to be parallel to the rotary shaft of the thrust axis so as to be perpendicular to each thrust portion,
    in the cruise mode, the first and second wings are changed to be at an inclined angle with respect to the rotary shaft such that an acute angle is formed between each thrust portion and each of the wings,
    in the high-speed flight mode, the rotary shaft of each thrust portion is changed to be parallel to the first and second wings such that each thrust portion is perpendicular to the first and second wings, and
    in the stationary flight mode, when wind is absent the first and second wings are changed to be perpendicular to the body and when wind is present the first and second wings are changed to be angled in a direction of the wind.

4. The aerial vehicle of claim 3, wherein a rotation speed of each thrust portion decreases when the angle between the respective thrust portion and the first and second wings is the acute angle, and the rotation speed of each thrust portion increases when the angle between the respective thrust portion and the first and second wings is a right angle.

5. The aerial vehicle of claim 1, wherein each thrust portion comprises:
    at least one first thrust portion having a rotary shaft and disposed away from one side of each of the wings; and
    at least one second thrust portion having a rotary shaft and disposed away from a side facing the one side of each of the wings, and
    the rotary shaft of the first thrust portion and the rotary shaft of the second thrust portion are perpendicular to the body.

6. The aerial vehicle of claim 1, wherein
    rotation angles of the first wing and the second wing are individually controlled such that a pose and a direction of the aerial vehicle are adjusted.

7. The aerial vehicle of claim 1, comprising:
    a sensor configured to measure information applied to the aerial vehicle; and
    a controller configured to control an angle between the rotary shaft and the first and second wings by pitch-rotating the first and second wings based on the information measured by the sensor,
    wherein the servomotor is controlled by the controller.

8. The aerial vehicle of claim 7, wherein the sensor comprises at least one of:
    a measurement sensor configured to measure an altitude, a speed, and a flow angle of an air generated in response to the aerial vehicle travelling;
    differential pressure sensors disposed on an upper side and a lower side of each of the wings to measure a flow angle using a pressure difference between the upper side and the lower side; and
    a flow sensor configured to measure an air flow around the aerial vehicle such that the controller controls the wings to be changed based on the air flow around the aerial vehicle.

* * * * *